Jan. 27, 1942.                E. RIEMENSCHNEIDER                2,270,968
PRESS
Filed July 20, 1939
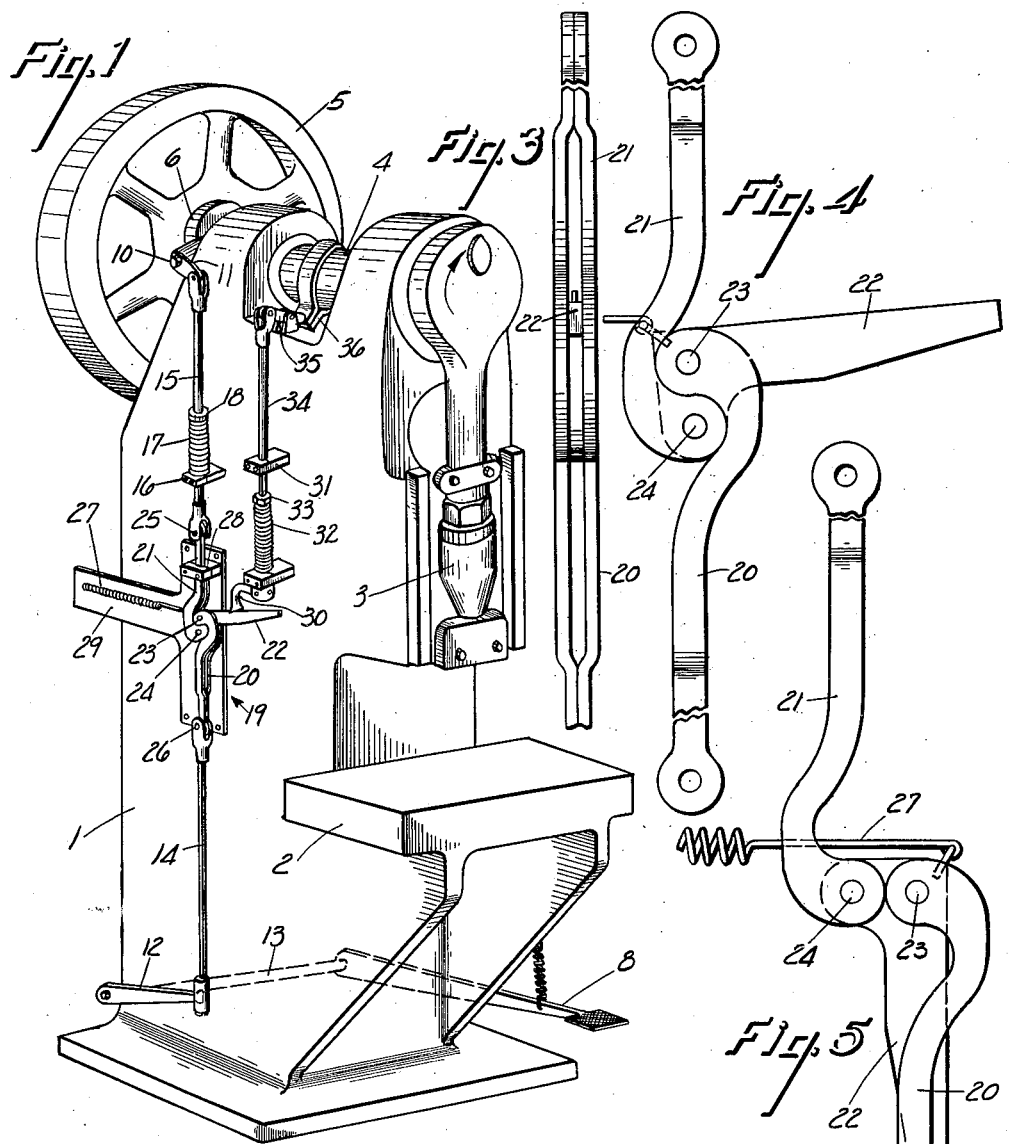
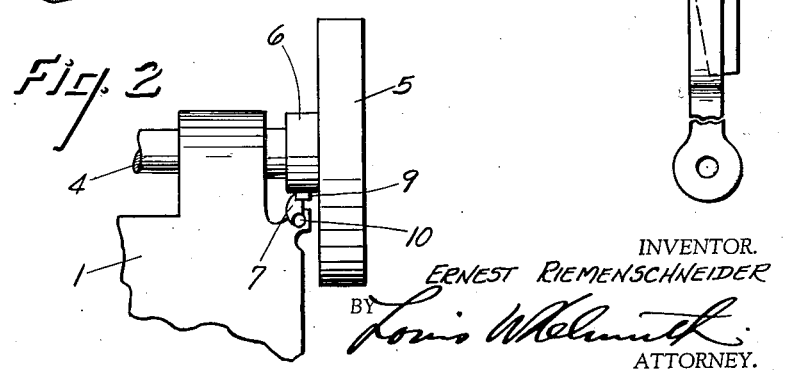
INVENTOR.
ERNEST RIEMENSCHNEIDER
BY
ATTORNEY.

Patented Jan. 27, 1942

2,270,968

UNITED STATES PATENT OFFICE 2,270,968

PRESS

Ernest Riemenschneider, Lakewood, Ohio, assignor to The Midland Steel Products Company, Cleveland, Ohio, a corporation of Ohio Application July 20, 1939, Serial No. 285,542

10 Claims. (Cl. 192—82)

This invention relates to new and useful improvements in presses and an important object of the invention is to provide a simple, sturdy and efficient safety attachment for converting a continuous operating press into a single stroke press to prevent carelessness of the operator unintentionally causing a repeat stroke of the press.

Other objects and advantages of the invention will become apparent during the course of the following description.

In the accompanying drawing forming a part of the application and wherein like numerals are employed to designate like parts throughout the several views, Fig. 1 is a perspective view of a press with the single stroke attachment applied thereto, Fig. 2 is a fragmentary side elevation of a portion of the press showing the usual clutch latch engaging a clutch operator to normally hold the clutch disengaged, Fig. 3 is an end view of a portion of a single stroke attachment, Fig. 4 is a side elevation of the same in cocked position, Fig. 5 is a similar view showing the device in uncocked position.

Referring to the drawing and detail, the numeral 1 designates the stand or frame of a press having the usual bed 2, slide 3, crank or driven shaft 4, drive wheel 5, clutch 6, clutch operating latch 7 and operating treadle 8. The crankshaft is provided with the usual friction brake, not shown. The clutch 6 is provided with the usual pin or pawl operator 9 which is normally projected into the path of the latch 7 and is engaged thereby to disengage the clutch so that the drivewheel 5 rotates independently of the crankshaft 4 when the treadle 8 is elevated. When the latch 7 is swung out of the path of movement of the operator 9 by depressing the pedal 8, the operator 9 projects itself outwardly causing engagement of the clutch to couple the drivewheel with the crankshaft, and when the latch 7 is returned into the path of movement of the operator, the operator again engages the latch upon a complete revolution of the drivewheel 5, the clutch is automatically disengaged to disconnect the drive wheel and the crankshaft to stop the crank on its high point by means of the friction brake which is adjusted to place a continual resistance upon turning of the crank shaft. In this type of press, the crank shaft continues to rotate as long as the treadle 8 is held depressed by the operator, and in order to convert the press into a single stroke operation and as a safety factor so that the press will not repeat when the operator unintentionally holds the treadle 8 depressed, a non-repeat device is installed so as to automatically cause the latch 7 to move back into position to engage the clutch operator 9 as soon as the treadle 8 is depressed, whereby the clutch will become automatically disengaged upon each complete revolution of the crankshaft to prevent the slide from making more than one stroke at a time. With this attachment, the crankshaft cannot be turned again until the treadle 8 is again elevated to its normal position, which resets the mechanism to cause engagement of the clutch upon the next depression of the treadle.

The clutch latch 7 is secured to the usual operating shaft 10 which is turned by an arm 11. This latch mechanism is a standard part of Bliss presses and the clutch 6 may be the usual Bliss rolling key clutch or any other type which will be normally disengaged by the latch mechanism 7. A treadle lever 12 is connected to the treadle shaft 13 in the usual manner, and in the ordinary continuous press control, a rod connects this lever 12 with the arm 11 for operating the latch 7.

The present invention contemplates a two piece rod in place of the customary one-piece rod; one of the rod sections being designated by the numeral 14 and the other by the numeral 15. The upper rod section 15 is pivotally connected with the arm 11 and passes through a guide 16 forming a seat for a compression coil spring 17 held compressed upon its seat by an abutment 18 secured to the section so that when this section 15 is released to the spring 17, the latch 7 is placed in the path of movement of the clutch operator 9 to disengage the clutch. The two rod sections 14 and 15 are connected with an extensible break joint device 19 which is composed of a lower section 20 and an upper section 21 pivotally connected to lower and upper rod sections 14 and 15 respectively. These sections 20 and 21 constituting the break joint have complementary cooperating angular or clutched inner ends pivotally connected by a swinging bellcrank trigger 22 fulcrumed at 23 to the lower section 20 and pivotally connected at 24 to the upper section 21. With the trigger 22 arranged in substantially horizontal position, the hooked upper end of lower section 20 carrying the fulcrum pivot 23 is nested in abutment with the crotch of the upper hooked lower end of section 21, to maintain the pivot 23 disposed above pivot 24 with its center in alignment in a line drawn between centers of pivots 25 and 26 which pivotally connect the rod sections 14 and 15 with a break joint. With this relation, the center of the lower pivot 24 is disposed in an off center position slightly out of line with a straight line drawn through the pivots 25, 23 and 26 whereby the break joint will transmit a straight line pull from the lower section 14 to the upper section 15 without breaking the joint, and so that when the treadle 8 is depressed the latch 7 will first be moved back out of engagement with the clutch operator 9 to permit the clutch to become engaged to drive the crankshaft 4, and then will immediately snap back to clutch disengaging position under the influence of spring 17.

In order to break this joint to permit the upper section 15 to be moved upwardly under the influence of spring 17 to return the latch 7 to clutch disengaging position to engage the clutch operator 9 when the wheel 5 has made a complete revolution, a positive acting trip mechanism is provided to depress the trigger 22 for swinging the pivot 23 over dead-center and for breaking the joint upon initial turning movement of the crankshaft 4. The break joint is held in the straight line pull position by means of a spring 27 connected to the angle of the bellcrank trigger 22 so as to normally hold and urge the pivots 23 and 24 to the position shown in Fig. 4. The upper section 21 of the break joint is guided through a suitable guide 28 extending from a T-shaped mounting plate 29 secured to the side of the press as illustrated. The trip 30 is carried by the lower end of a trip rod guided vertically in a pair of guides 31 and between which a coiled compression spring 32 is mounted upon the rod and engages an abutment 33 for normally urging the trip rod 34 upwardly with the trip abutting the lower guide directly above the trigger 22. The upper end of trip rod 34 is pivotally connected to a lever 35 which has its free end arranged in the path of movement of a lug formed on a collar secured to the crank shaft, so that upon initial turning of the crankshaft, the trip 30 is depressed to overtake and kick the trigger 22 down to break the joint in the treadle operated rod to the position shown in Fig. 5 so that the treadle 8 can remain depressed while the upper section 15 of the rod springs back to normal position and restores the latch to a position to disengage the clutch upon nearing the completion of one rotation of the driver 5 and crankshaft 4 to prevent a repeat stroke of the press. The press cannot operate again until the operator intentionally and deliberately permits the treadle to become elevated to its normal position thereby permitting the trigger 22 and break joint to be restored to the position shown in Figs. 1 and 4, ready to be tripped again when the treadle is again depressed to operate the press.

Various changes in the shape and arrangement of parts may be resorted to without departing from the scope of the appended claims.

I claim:

1. A nonrepeat device for presses including a pair of relatively movable members having identical hook-shape ends, said members being normally movable as a unit in one direction when in substantially longitudinal alignment with their hooked ends nested and inter-engaging, one of said members being slidable and the other swingable, spring means normally urging said slidable member lengthwise of the swingable member, and a trigger pivoted at one end to the slidable member and pivotally connected at its elbow to the swingable member to engage and disengage the hooked ends of said members.

2. A nonrepeat device for presses including a pair of relatively movable normally aligned members movable in one direction as a unit when aligned, spring means normally urging one of said members in the opposite direction, said spring urged member having an abutment and the other member being pivotally mounted, a trigger having a pivot connected to said spring urged member and a second pivot connected to the pivotally mounted member, spring means connected to said trigger for normally urging it to position with one of its pivots in substantial alignment with said members and against the abutment of the spring urged member, and means for swinging the trigger to swing its pivot out of substantial alignment with said members to release the spring urged member to independent movement.

3. A nonrepeat device for presses including a pair of relatively movable members movable normally aligned in one direction as a unit when aligned, spring means normally urging one of said members in the opposite direction, said spring urged member having an abutment, a bellcrank trigger having a pivot connected to said spring urged member and its fulcrum pivot connected to said pivoted member and normally engaged with said abutment to retain said pivots on one side of dead center, and means for swinging this trigger to move its fulcrum pivot out of alignment with said members to release the spring urged member to movement independent of that of the other member.

4. A nonrepeat device for presses including a pair of relatively movable members normally movable in one direction as a unit, spring means normally urging one of said members in the opposite direction, a trigger pivotally connected to said spring urged member and also pivotally connected to said other member whereby a pull on said latter member will move the spring urged member against the tension of said spring means, and means for swinging the trigger relative to said spring urged member to release said member to be moved by said spring means in a direction opposite to the movement of said other member.

5. A nonrepeat device for presses including a pair of relatively movable members normally movable in one direction as a unit, spring means normally urging one of said members in the opposite direction, a trigger pivotally connected to both of said members whereby a pull on one member will move the other member in the same direction, and means for swinging said trigger relative to said members to enable said spring urged member to move in the opposite direction while the other member is being moved in the first named direction, and spring means for returning said trigger to normal position.

6. In a press which includes drive and driven shafts, a clutch normally urged to engage and including a clutch operator, a treadle, a clutch operating latch normally urged to hold the clutch operator to disengage the clutch; a nonrepeat device operated by the treadle and including a pair of members operatively connecting the treadle and clutch, a break joint connecting said members and normally capable of transmitting a straight line pull to engage the clutch as the treadle is being depressed, said break joint including a trigger pivotally connected to both of said members, and a trip mechanism operated by the driven shaft and adapted to engage said trigger to break the joint whereby said members move relatively to engage the clutch while the treadle is being depressed, and said trigger and break joint between the members being re-established to normal position when the treadle is elevated.

7. A device of the class described comprising a pair of relatively movable members normally movable in one direction as a unit when substantially aligned and capable of moving relatively in opposite directions when mis-aligned, and a link having pivots connected to said members, whereby when the link is turned the pivots are disposed in substantial alignment with the members so that a pull lengthwise upon one member will cause both members to move as a unit, and when the link is turned in the opposite direction the pivots are mis-aligned with said members, the latter move relatively.

8. A device of the class described comprising a pair of relatively movable members normally movable in one direction as a unit when substantially aligned and capable of moving relatively in opposite directions when mis-aligned, each of said members having corresponding hooked bifurcated ends, said members being arranged in opposed relation with one inverted with respect to the other, and a bellcrank having an angular end arranged in the bifurcations of the hooked ends with its elbow connected by a pivot to one member and its free end connected by a second pivot to the other member, whereby when the bellcrank is turned the pivots are disposed in substantial alignment with the members, the hooked ends will be nested in and will abut the crotches of the hooks so that a pull lengthwise upon one member will cause both members to move as a unit, and when the bellcrank is turned in the opposite direction the pivots are mis-aligned with said members, the latter move relatively.

9. A nonrepeat device for presses and the like including a pair of relatively movable normally aligned members movable in one direction as a unit when aligned, spring means normally urging one of said members in the opposite direction, one of said members being pivotally mounted, and a movable trigger having a pivot connected to said spring urged member and a second pivot connected to the pivotally mounted member, said pivots when arranged in alignment with said members causing them to move as a unit, and when mis-aligned with the members releases the spring urged member to independent movement.

10. A nonrepeat device for presses and the like including a pair of relatively movable normally aligned members movable in one direction as a unit when aligned, spring means normally urging one of said members in the opposite direction, one of said members being pivotally mounted, and a bellcrank trigger having its fulcrum pivot connected to the pivotally mounted member and a second pivot on its working end connected to said spring urged member, said trigger having a lever arm extending laterally of said members, said pivots when arranged in alignment with said members causing them to move as a unit when the pivotally mounted member is moved in a rectilinear path longitudinally of the aligned members, and when said pivots are mis-aligned with the members, the spring urged member is moved independently of the other member.

ERNEST RIEMENSCHNEIDER.